US011026237B2

United States Patent
Zhang et al.

(10) Patent No.: US 11,026,237 B2
(45) Date of Patent: Jun. 1, 2021

(54) METHODS AND DEVICES FOR COMMUNICATION OF A SIGNAL BASED ON AN ALLOCATED RESOURCE BLOCK

(71) Applicant: Telefonaktiebolaget LM Ericsson (publ), Stockholm (SE)

(72) Inventors: Zhan Zhang, Beijing (CN); Shaohua Li, Beijing (CN); Jinhua Liu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 52 days.

(21) Appl. No.: 16/317,320

(22) PCT Filed: Jan. 23, 2018

(86) PCT No.: PCT/CN2018/073795
§ 371 (c)(1),
(2) Date: Jan. 11, 2019

(87) PCT Pub. No.: WO2018/171323
PCT Pub. Date: Sep. 27, 2018

(65) Prior Publication Data
US 2019/0230670 A1    Jul. 25, 2019

(30) Foreign Application Priority Data
Mar. 24, 2017   (WO) ................ PCT/CN2017/078125

(51) Int. Cl.
*H04W 72/08* (2009.01)
*H04W 72/12* (2009.01)

(52) U.S. Cl.
CPC ....... *H04W 72/08* (2013.01); *H04W 72/1268* (2013.01); *H04W 72/1242* (2013.01)

(58) Field of Classification Search
CPC ............. H04W 72/08; H04W 72/1268; H04W 72/1242
See application file for complete search history.

(56) References Cited

U.S. PATENT DOCUMENTS

2007/0195907 A1*  8/2007  Wang .................... H04L 1/0006
                                                     375/267
2015/0171983 A1*  6/2015  Kusashima ......... H04W 72/082
                                                     370/329

(Continued)

FOREIGN PATENT DOCUMENTS

CN      105636214 A    6/2016
RU      2560137 C2     8/2015

OTHER PUBLICATIONS

EP16197182, User Equipment, Base Station, Wireless Communication Network, Data Signal and Method to Provide Enhanced SPS Control and Continuous SPS After Handover, Mar. 11, 2016, pp. 1-57, [Retrieved on Jan. 28, 2021] Retrieved From: PE2E-DAV. (Year: 2016).*

(Continued)

*Primary Examiner* — Omar J Ghowrwal
(74) *Attorney, Agent, or Firm* — Withrow & Terranova, PLLC (57) ABSTRACT

Embodiments of the present disclosure relate to methods and devices for uplink puncturing. In example embodiments, the terminal device obtains a first signal to be transmitted for a first service requiring a first latency. Then, the terminal device determines whether a resource block has been a shared one for the first service requiring a first latency or allocated by a network device for a second service requiring a second latency higher than the first latency. If it is determined that the resource block has been allocated for the second service, the terminal device selects a first set of resource elements based on a predefined pattern of resource (Continued)

elements. The first set of resource elements are discontinuously distributed in the allocated resource block. The terminal device transmits the first signal for the first service to the network device at the first set of resource elements.

20 Claims, 7 Drawing Sheets

(56) References Cited

U.S. PATENT DOCUMENTS

2015/0334685 A1   11/2015  Ji et al.
2016/0197757 A1\*  7/2016  Baek ................... H04L 27/2649
                                                            375/295
2019/0261395 A1\*  8/2019  Goektepe .......... H04W 72/1263

OTHER PUBLICATIONS

Decision to Grant for Russian Patent Application No. 2019133693/07(066547), dated Feb. 18, 2020, 28 pages.
Examination Report No. 1 for Australian Patent Application No. 2018240040, dated May 1, 2020, 4 pages.
Guangdong OPPO Mobile Telecom, "R1-1611700: eMBB data transmission to support dynamic resource sharing between eMBB and URLLC," Third Generation Partnership Project (3GPP), TSG RAN WG1 Meeting #87, Nov. 14-18, 2016, 4 pages, Reno, USA.
Intel Corporation, "R1-1609543: On HARQ support for URLLC," Third Generation Partnership Project (3GPP), TSG RAN WG1 Meeting #86bis, Oct. 10-14, 2016, 5 pages, Lisbon, Portugal.
Samsung, "R1-1612540: eMBB and URLLC multiplexing in DL," Third Generation Partnership Project (3GPP), TSG RAN WG1 Meeting #87, Nov. 14-18, 2016, 5 pages, Reno, USA.
ZTE et al., "R1-1611288: About URLLC/eMBB multiplexing," Third Generation Partnership Project (3GPP), TSG RAN WG1 Meeting #87, Nov. 14-18, 2016, 8 pages, Reno, USA.
International Search Report and Written Opinion for International Patent Application No. PCT/CN2018/073795, dated Mar. 30, 2018, 10 pages.
MediaTek Inc., "R1-1612149: URLLC and eMBB DL Multiplexing using CRC," 3GPP TSG RAN WG1 Meeting #87, Nov. 14-18, 2016, Reno, USA, 6 pages.
Extended European Search Report for European Patent Application No. 18771493.6, dated Jan. 13, 2020, 11 pages.
Guangdong Oppo Mobile Telcom, "R1-1701963: DL control channel design for URLLC," Third Generation Partnership Project, TSG RAN WG1 Meeting #88, Feb. 13-17, 2017, 4 pages, Athens, Greece.
Wilus Inc., "R1-1703031:Consideration on DL control and data channel for URLLC ," Third Generation Partnership Project, TSG RAN WG1 Meeting #88, Feb. 13-17, 2017, 6 pages, Athens, Greece.
The First Office Action for Chinese Patent Application No. 201880002873.2, dated Sep. 11, 2020, 20 pages.

\* cited by examiner

METHODS AND DEVICES FOR COMMUNICATION OF A SIGNAL BASED ON AN ALLOCATED RESOURCE BLOCK

This application is a 35 U.S.C. § 371 national phase filing of International Application No. PCT/CN2018/073795, filed Jan. 23, 2018, which claims the benefit of International Application No. PCT/CN2017/078125, filed Mar. 24, 2017, the disclosures of which are incorporated herein by reference in their entireties.

TECHNICAL FIELD

Embodiments of the present disclosure generally relate to the field of telecommunications, and in particular, to methods and devices for uplink (UL) puncturing transmission.

BACKGROUND

An Ultra-Reliable and Low-Latency Communication (URLLC) service has been proposed for providing high reliability and low latency. For example, a latency required by the URLLC service may range from 1 ms to 10 ms depending on different applications, including automation applications, smart grid, intelligent transportation, and the like. In terms of the reliability, the URLLC service may require a residual error rate of $10^{-4}$, $10^{-6}$, or $10^{-9}$. In calculation of the residual error rate of the URLLC service, it is proposed that a packet received after the required latency such as 1 or 10 ms may be considered to be errors or invalid.

In general, the high reliability and the low latency are mutually conflicting requirements, and trade-off often needs to be made between them. Accordingly, it will be a challenge for the URLLC service to meet both of the two requirements. For example, a remarkable challenge may be posed to user-plane (UP) design. Furthermore, many layers and components of both a radio access network (RAN) and a core network may be adapted, for example, to provide relatively high Quality of Service (QoS) in terms of the reliability and latency.

In particular, the URLLC service is often sporadic in uplink (UL). Accordingly, a network device may not schedule a timely UL grant for this service, especially, when a further UL service is ongoing.

SUMMARY

In general, example embodiments of the present disclosure provide methods and devices for UL puncturing transmission.

In a first aspect, a method implemented at a terminal device is provided.

According to the method, the terminal device obtains a first signal to be transmitted for a first service requiring a first latency. Then, the terminal device determines whether a resource block has been allocated by a network device for a second service requiring a second latency higher than the first latency. If it is determined that the resource block has been allocated for the second service, the terminal device selects a first set of resource elements based on a predefined pattern of resource elements. The first set of resource elements are discontinuously distributed in the allocated resource block. The terminal device transmits the first signal for the first service to the network device at the first set of resource elements.

In some embodiments, the method may further comprise: receiving an indication of the predefined pattern of resource elements from the network device.

In some embodiments, selecting the first set of resource elements may comprise: determining, based on the predefined pattern of resource elements, resource element candidates of the allocated resource block to be potentially used by the first service, the resource element candidates being discontinuously distributed in the allocated resource block; and selecting the first set of resource elements from the resource element candidates.

In some embodiments, selecting the first set of resource elements may comprise: selecting the first set of resource elements within a predetermined number of slots in the allocated resource block, the predetermined number being below a first threshold number.

In some embodiments, selecting the first set of resource elements may comprise: selecting, in the allocated resource block, the first set of resource elements positioned at a distance below a threshold distance from reference resource elements.

In some embodiments, the method may further comprise: determining at least one parameter for the transmission of the first signal, the at least one parameter being selected from at least one of: a transmission power, bundled repetition numbers, a size of a code block, padding configuration of the code block, a size of a transmission block, a modulation and coding scheme, and a Cyclic Redundancy Check, CRC sequence.

In some embodiments, the method may further comprise: receiving the at least one parameter from the network device.

In some embodiments, the method may further comprise: transmitting a second signal for the second service to the network device at other resource elements than the first set of resource elements in the allocated resource block.

In some embodiments, transmitting the first signal for the first service may comprise: superimposing the first signal for the first service and a first part of a second signal for the second service as a third signal; and transmitting the third signal to the network device at the first set of resource elements.

In some embodiments, superimposing the first signal and the first part of the second signal may comprise: superimposing the first signal and the first part of the second signal as the third signal by modulating the first signal and the first part of the second signal using a predetermined superposition modulation scheme.

In some embodiments, the method may further comprise: transmitting a second part of the second signal to the network device at other resource elements than the first set of resource elements in the allocated resource block.

In some embodiments, the first part of the second signal may be modulated with a first modulation order, and the second part of the second signal may be modulated with a second modulation order higher than the first modulation order.

In some embodiments, the first part of the second signal may be encoded with a first code rate, and the second part of the second signal may be encoded with a second code rate different from the first code rate.

In some embodiments, the method may further comprise: receiving an acknowledgement for at least one of the first and second signals from the network device.

In some embodiments, the method may further comprise: obtaining a code block to be transmitted for the second service; selecting a second set of resource elements in the allocated resource block, the number of resource elements in an intersection of the first and second sets of resource elements being below a second threshold number; and mapping the code block to the second set of resource elements.

In some embodiments, the first service may include an ultra-reliable and low-latency communications, URLLC, service.

In some embodiments, the second service may include an enhance Mobile Broadband, eMBB, service.

In a second aspect, a method implemented at a network device is provided. The method comprises: determining a first set of resource elements based on a predefined pattern of resource elements, the first set of resource elements being to be used for receiving from a terminal device a first signal for a first service requiring a first latency, the first set of resource elements being discontinuously distributed in a resource block having been allocated by the network device to the terminal device for a second service requiring a second latency higher than the first latency; and receiving the first signal for the first service at the first set of resource elements.

In some embodiments, the method may further comprise: sending an indication of the predefined pattern of resource elements to the terminal device.

In some embodiments, determining the first set of resource elements may comprise: determining, based on the predefined pattern of resource elements, resource element candidates of the resource block to be potentially used by the first service, the resource element candidates being discontinuously distributed in the allocated resource block; and determining the first set of resource elements from the resource element candidates.

In some embodiments, determining the first set of resource elements may comprise: determining the first set of resource elements within a predetermined number of slots in the resource block, the predetermined number being below a first threshold number.

In some embodiments, determining the first set of resource elements may comprise: determining, in the resource block, the first set of resource elements positioned at a distance below a threshold distance from reference resource elements.

In some embodiments, the method may further comprise: determining at least one parameter for the reception of the first signal, the at least one parameter being selected from at least one of: a transmission power, bundled repetition numbers, a size of a code block, padding configuration of the code block, a size of a transmission block, a modulation and coding scheme, and a Cyclic Redundancy Check, CRC sequence.

In some embodiments, the method may further comprise: sending the at least one parameter to the terminal device.

In some embodiments, the method may further comprise: receiving a second signal for the second service from the terminal device at other resource elements than the first set of resource elements in the resource block.

In some embodiments, receiving the first signal for the first service may comprise: detecting a signal candidate at the first set of resource elements.

In some embodiments, receiving the first signal for the first service may further comprise: demodulating the detected signal candidate using a first demodulation scheme associated with a first modulation order.

In some embodiments, receiving the first signal for the first service may further comprise: decoding the detected signal candidate using a first decoding scheme associated with a first code rate.

In some embodiments, receiving the first signal for the first service may further comprise: demodulating, using a third demodulation scheme associated with a predetermined superposition modulation, the detected signal candidate to obtain the first signal and a first part of a second signal for the second service.

In some embodiments, the method may further comprise: receiving a second part of the second signal from the terminal device at other resource elements than the first set of resource elements in the resource block.

In some embodiments, the method may further comprise: transmitting an acknowledgement for at least one of the first and second signals to the terminal device.

In a third aspect, there is provided a device implemented at a terminal device. The device comprises a processor and a memory. The memory contains instructions executable by the processor, whereby the device is operative to perform the method according to the first aspect.

In a fourth aspect, there is provided a device implemented at a network device. The device comprises a processor and a memory. The memory contains instructions executable by the processor, whereby the device is operative to perform the method according to the second aspect.

In a fifth aspect, there is provided a computer readable storage medium that tangibly stores a computer program product. The computer program product includes instructions which, when executed on at least one processor, cause the at least one processor to carry out the method according to the first or second aspect.

Through the following description, it would be appreciated that according to embodiments of the present disclosure, the terminal device uses the first set of resource elements (REs) discontinuously distributed in a resource block allocated by the network device for the second service to transmit the first signal for the first service requiring a lower latency than the second service. In this way, the low latency requirement of the first service may be met while impairing of the second service due to the missing of the REs preempted by the first service may be reduced.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" refers to a device capable of, configured for, arranged for, and/or operable for communications with a network device or a further terminal device in a wireless communication network. The communications may involve transmitting and/or receiving wireless signals using electromagnetic signals, radio waves, infrared signals, and/or other types of signals suitable for conveying information through air. In particular embodiments, the terminal device may be configured to transmit and/or receive information without direct human interaction. For instance, the terminal device may be designed to transmit information to a network side on predetermined schedules, when triggered by an internal or external event, or in response to requests from the network side.

The terminal device may refer to the endpoint of a wireless connection. Accordingly, the terminal device may be referred to as a wireless terminal. Furthermore, the terminal device may be mobile and, accordingly, referred to as a mobile device or a mobile terminal. Examples of the terminal device include, but are not limited to, user equipment (UE) such as smart phones. Further examples of the terminal device include wireless-enabled tablet computers, laptop-embedded equipment (LEE), laptop-mounted equipment (LME), and/or wireless customer-premises equipment (CPE).

As one specific example, the terminal device may be configured for communication in accordance with one or more communication technologies and corresponding communication standards promulgated by the 3rd Generation Partnership Project (3GPP), the Internet Engineering Task Force (IETF), or other standardization organizations, such as Global System for Mobile (GSM), Universal Mobile Telecommunications System (UMTS), Code Division Multiple Access (CDMA), Wideband Code Division Multiple Access (WCDMA), High-Speed Packet Access (HSPA), Long Term Evolution (LTE), LTE-Advanced (LTE-A), Orthogonal Frequency Division Multiplexing (OFDM), Device-to-Device (D2D) communications, the fifth generation (5G) standards, wireless local area network (WLAN), Worldwide Interoperability for Microwave Access (WIMAX) wireless communications technology, BLUETOOTH wireless communications technology, ZIGBEE wireless communications technology, and/or any other technologies either currently known or to be developed in the future.

As used herein, the term "user equipment" or "UE" may not necessarily have a "user" in the sense of a human user who owns and/or operates the relevant device. Instead, the UE refers to a device that is intended for sale to, or operation by, a human user but that may not initially be associated with a specific human user. For the purpose of discussion, in the following, some embodiments will be described with reference to UEs as examples of the terminal devices, and the terms "terminal device" and "user equipment" (UE) may be used interchangeably in the context of the present disclosure.

As used herein, the term "network device" refers to a transmission/reception device in a wireless communication network, which provides a coverage area and via which a terminal device within the coverage area may access the network and/or services. Examples of the network device include, but are not limited to, a base station (BS), a relay, an access point (AP), Multi-cell/Multicast Coordination Entity (MCE), a gateway, a server, a controller or any other suitable device in the wireless communication network. The BS may include, for example, a node B (NodeB or NB), an evolved NodeB (eNodeB or eNB), a next generation NodeB (gNB), a Remote Radio Unit (RRU), a radio header (RH), a remote radio head (RRH), a low power node such as a femto, a pico, and the like. For the purpose of discussion, in the following, some embodiments will be described with reference to an eNB as an example of the network device.

Further examples of the network device include multi-standard radio (MSR) radio equipment such as MSR BSs, network controllers such as radio network controllers (RNCs) or base station controllers (BSCs), base transceiver stations (BTSs), transmission points, transmission nodes, transmit-receive points (TRPs), Multi-cell/multicast Coordination Entities (MCEs), core network nodes, such as Mobile Switching Centers (MSCs) and MMEs, Operation and Management (O&M) nodes, Operation Support System (OSS) nodes, Self-Organization Network (SON) nodes, positioning nodes, such as Enhanced Serving Mobile Location Centers (E-SMLCs), and/or Mobile Data Terminals (MDTs). More generally, the network device refers to any suitable device (or group of devices) capable of, configured for, arranged for, and/or operable for enabling and/or allowing the access of the terminal device to the wireless communication network or providing some services to the terminal device that has accessed the wireless communication network.

As used herein, the term "resource block" refers to a plurality of resource elements (REs) that are continuous for example in time and frequencies. One resource block may include any suitable number of physical resource blocks (PRBs) as specified by the 3GPP.

As used herein, the phrase "pattern of resource elements" or "pattern of REs" refers to a pattern formed by a plurality of resource elements (REs) in a resource block. This pattern may represent positions, positional relations, or distributions of the plurality of REs within the resource block.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

As describe above, the URLLC service is often sporadic in UL. For example, data of the URLLC service (or URLLC data) arrives at a terminal device (for example, a UE), sporadically. In this case, the network device (for example, a gNB) does not know when the URLLC data will occur from the UE and may not schedule corresponding uplink (UL) resources. Accordingly, when the UE has the URLLC data to be transmitted, the UE may have no grant for the transmission. In particular, if a Media Access Control (MAC) Packet Data Unit (PDU) for a further service has been built or even already started when the URLLC data is generated, the UE has to wait to transmit the URLLC data until a next UL granted time period. Therefore, the latency of the URLLC service may be significantly increased. If time duration for scheduling is relatively long, the latency may get larger.

In downlink (DL), it has proposed to multiplex the URLLC service and an enhanced Mobile Broadband (eMBB) service to improve the latency of the URLLC service. Several configurations for this multiplexing have been proposed to meet different latency and/or reliability requirements of the two services. For example, one configuration is that the same sub-carrier spacing may be adopted for the multiplexed services, and the same CP overhead may or may not applied. Another configuration is that different sub-carrier spacing may be adopted for the multiplexed services. The network may enable both of the configurations. Furthermore, dynamic resource sharing may be allowed between the two services.

The eMBB service in UL is contention-free and grant-based. If the UE has the URLLC data to be transmitted during the granted time duration for the transmission of data of the eMBB service (or eMBB data), it is proposed to multiplex the two services by prioritizing the URLLC data over the eMBB data due to the different QoS requirements of the eMBB and URLLC services. In this way, the UE may use the grant assigned to the eMBB service for the URLLC service.

Figure 1:
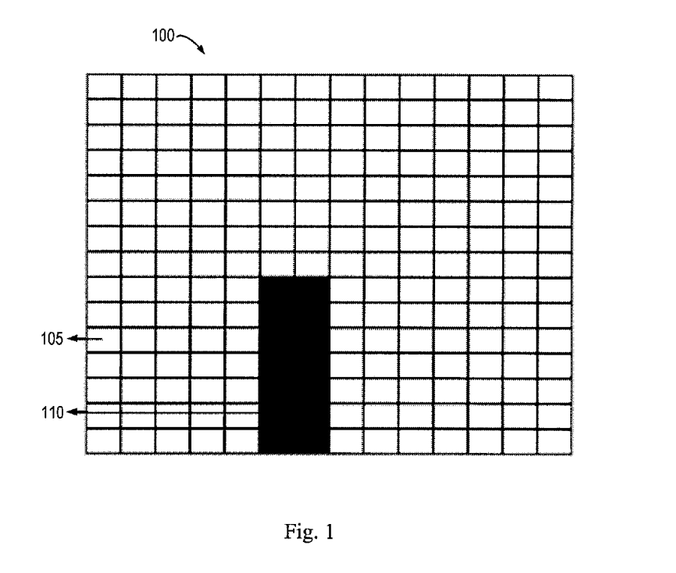
FIG. 1 shows an example conventional approach of multiplexing data transmissions of the URLLC and eMBB services in UL.

FIG. 1 shows an example conventional approach of multiplexing data transmissions of the two services in UL. In this example, a group of physical resource blocks (PRBs) 100 have been allocated to the data transmission of the eMBB service. The group of PRBs 100 include a plurality of PRBs 105. The UE may select a consecutive time-frequency resource block 110 from the group of PRBs 100 for the data transmission of the URLLC service. The URLLC data may be transmitted as a MAC PDU independent of MAC PDUs for the eMBB data. In this way, the URLLC service may preempt the resources scheduled for the eMBB service, and therefore the latency requirement of the URLLC service may be ensured.

The above preempting of the resources may fasten the data transmission of the URLLC service. However, this preempting may cause a part of the eMBB data missing, and further cause a detection of a whole transport block (TB) of the eMBB data failed at a receiving side. The failed detection of the TB may then cause a retransmission of the eMBB data. Therefore, transmission performance of the ongoing eMBB service may be seriously deteriorated, and system spectrum efficiency may be degraded. In addition, the multiplexing of the URLLC and eMBB services may induce a substantially high processing complexity and additional signaling overhead.

In order to at least in part solve the above and other potential problems, embodiments of the present disclosure present allow a terminal device to use a set of resource elements (REs) (referred to as "a first set of REs") discontinuously distributed in a resource block allocated by a network device for a service to transmit a signal for a further service requiring a lower latency than the service. For the purpose of discussion, the service requiring the lower latency will be referred to as a first service. The signal for the first service will be referred to as a first signal. The service requiring a higher latency will be referred to as a second service.

In this way, if the first service occurs when the second service is ongoing, the terminal device may initiate the first service using the discontinuously distributed REs that are determined based on a predefined pattern of REs from the resource block allocated for the second service. Thereby, the low latency requirement of the first service may be met while impairing of the second service due to the missing of the REs preempted by the first service may be reduced.

Considering an example where the first service is the URLLC service and the second service is the eMBB service, according to embodiments of the present disclosure, a predefined pattern of REs may be used to select a first set of REs from a resource block (for example, one or more PRBs) allocated for the eMBB service to carry the URLLC service. The first set of REs are discontinuously distributed in the allocated resource block. A TB of URLLC data may be separately encoded or modulated, and the encoded data are transmitted in a form of symbols using the selected REs. In general, a data packet of the URLLC service has a block size much smaller than a data packet of the eMBB service. The preempting of discontinuous REs in the allocated resource block may significantly mitigate impact on the transmission performance of the eMBB data.

In order to further optimize the resource efficiency, latency, and/or robustness, other mechanisms for multiplexing the first and second services may also presented in the present disclosure. Related details will be described in the following paragraphs.

Figure 2:
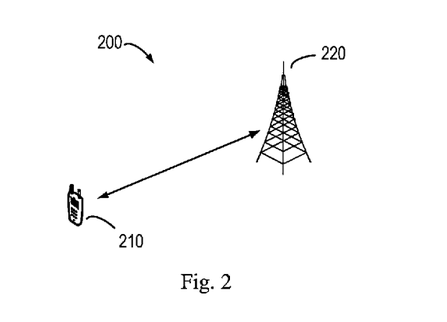
FIG. 2 shows an example wireless communication network in which embodiments of the present disclosure can be implemented.

FIG. 2 shows an example wireless communication network 200 in which embodiments of the present disclosure can be implemented. The network 200 includes a terminal device 210 and a network device 220. The terminal device 210 may communicate with the network device 220, or with a further terminal device (not shown) via the network device 220. The communications may conform to any suitable standard and using any suitable communication technologies such as LTE, LTE-A, OFDM, HSPA, WCDMA, CDMA, GSM, WLAN, WIMAX, BLUETOOTH, ZIGBEE, and/or any other technologies either currently known or to be developed in the future. It is to be understood that the network 200 may include any suitable number of terminal devices and network devices.

According to embodiments of the present disclosure, the terminal device 210 may conduct the first and second services via the network device 220 in UL. The terminal device 210 may obtain an UL grant from the network device 220 to initiate the second service. The UL grant may be scheduled by the network device 220 in a semi-persistent or dynamical way. The terminal device 210 may also intend to initiate the first service after the network device 220 sends downlink control information (DCI) or even during the transmission of a MAC PDU or a corresponding TB of the second service.

Figure 3:
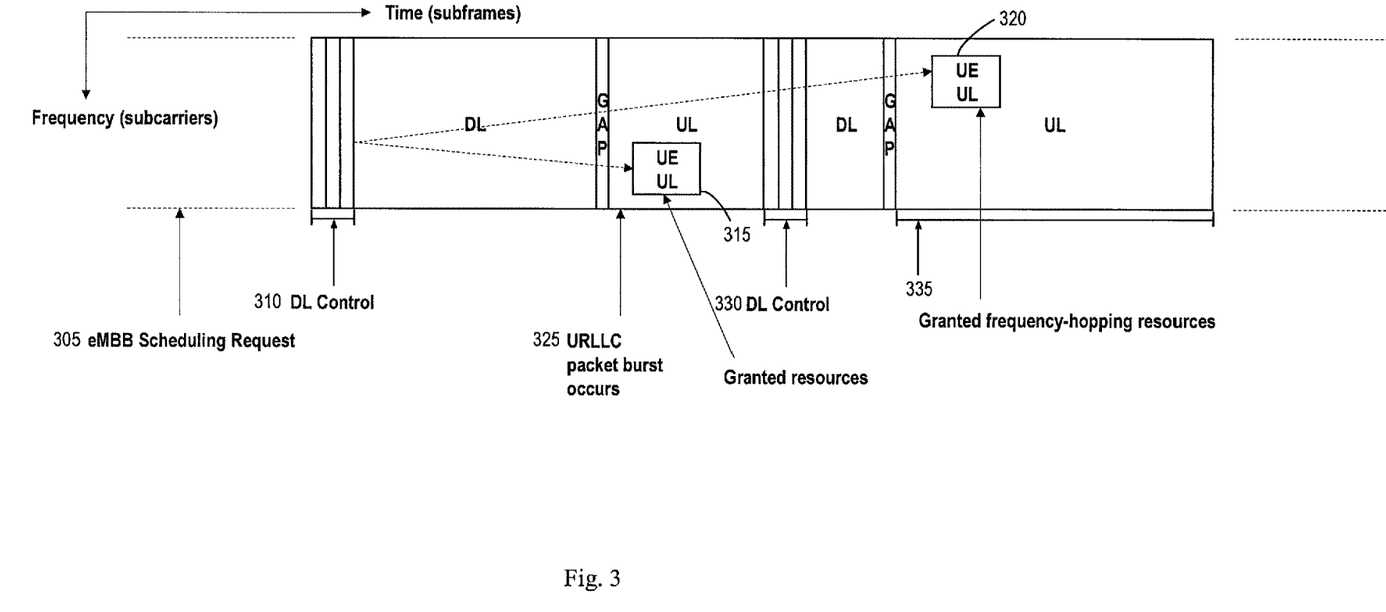
FIG. 3 shows example timing in the scenario where the data of the first service occurs after the second service have been initiated in accordance with some embodiments of the present disclosure.

FIG. 3 shows example timing in the scenario where the data of the first service arrives at the terminal device 210 after the second service have been initiated. In this example, the first and second services are implemented as the URLLC and eMBB services, respectively. As shown, the terminal device 210 sends to the network device 220 a scheduling request for initiating the eMBB service at a time instant 305. Then, an UL grant for the eMBB service is sent from the network device 220 to the terminal device 210 in a time period 310 of transmission of DCI. In this example, the network device 220 allocates two frequency-hopping resource blocks 315 and 320 for the UL transmission.

After the data transmission for the eMBB service has started, a packet burst for the URLLC service occurs in a time instant 325 at the terminal device 210. In this case, conventionally, the terminal device 210 may not obtain an UL grant for the URLLC service until a next time period 330 of the DCI transmission. The terminal device 210 may then transmit the packet burst for the URLLC service using newly granted resources (not shown) within or after a time period 335 for UL transmission. This may result in a relatively high latency, which is not acceptable for the URLLC service.

According to embodiments of the present disclosure, when the packet burst for the URLLC service occurs at the time instant 325, the terminal device 210 may select a set of REs from the resource block 315 or 320 based on a predefined pattern of REs, and the selected REs are discontinuously distributed in the corresponding resource block 315 or 320. The terminal device 210 may then use these REs to transmit the packet burst for the URLLC service. In this way, the latency of the URLLC service may be significantly reduced while the impact on the transmission performance of the ongoing eMBB service may be mitigated. Principles and implementations of the present disclosure will be described below with reference to FIGS. 4-7.

Figure 4:
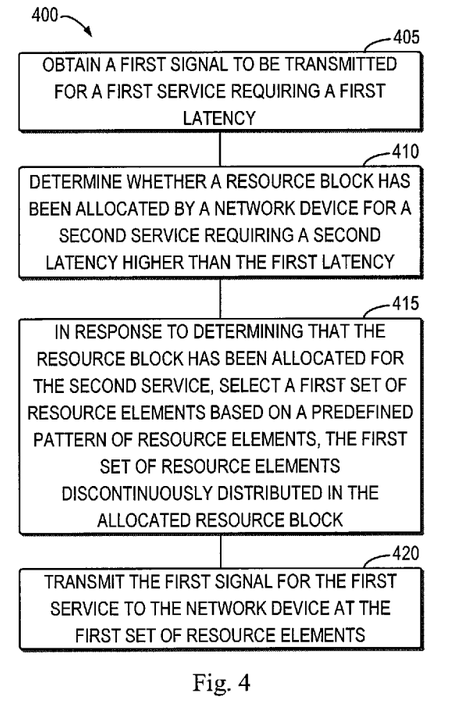
FIG. 4 shows a flowchart of an example method in accordance with some embodiments of the present disclosure.

FIG. 4 shows a flowchart of an example method 400 in accordance with some embodiments of the present disclosure. The method 400 can be implemented at the terminal device 210 as shown in FIG. 2. For the purpose of discussion, the method 400 will be described with reference to FIG. 2.

At block 405, the terminal device 210 obtains the first signal to be transmitted for the first service requiring a latency (referred to as a "first latency"). Then, at block 410, the terminal device 210 determines whether a resource block (for example, one or more PRBs) has been allocated by the network device 220 for the second service requiring a latency (referred to as a "second latency") higher than the first latency. The first and second services may include any suitable services having different latency requirements. As an example, the first service may include the URLLC service, and the second service may include the eMBB service. Other types of services are also possible. For example, in some implementations, the second service may be implemented as a machine type communication service which has a lower latency requirement compared with the URLLC service.

If it is determined that the resource block has been allocated for the second service, at block 415, the terminal device 210 selects a first set of REs in the allocated resource block based on a predefined pattern of REs. The first set of REs are discontinuously distributed in the allocated resource block.

The terminal device 210 may obtain the predefined pattern of REs in any suitable approach. For example, the terminal device 210 may receive an indication of the predefined pattern of REs from the network device 220. As another example, the predefined pattern of REs may be pre-configured in the network 200, and any entity in the network is aware of the pattern. In some embodiments, several patterns of the REs may be predefined. The terminal device 210 may select one of the patterns for the selection of the first set of REs.

According to embodiments of the present disclosure, the predefined pattern indicates the REs of the allocated resource block which will be potentially used by or shared with the first service. In some embodiments, when the terminal device 210 selects the first set of resource elements from the allocated resource block, the terminal device 210 may first determine, based on the predefined pattern of resource elements, resource element candidates of the allocated resource block to be potentially used by the first service. The resource element candidates are discontinuously distributed in the allocated resource block. Then, the terminal device 210 may select the first set of resource elements from the resource element candidates.

The predefined pattern of REs may be any suitable pattern that may enable the selected REs to be discontinuous in time and frequency domains within the resource block allocated for the second service. In order to further reduce the latency of the first service, in some embodiments, the predefined pattern of REs may be arranged to enable the first set of REs within a predetermined number of slots in the allocated resource block. The predetermined number is below a threshold number (referred to as a "first threshold number"). For example, the REs based on the predefined pattern may be arranged within one OFDM symbol or several subsequent OFDM symbols as less as possible so as to quicken the initiation of the first service as soon as possible.

In order to further enhance the reliability of the first service, in some embodiments, the predefined pattern of REs may be arranged near reference REs. The reference REs may be implemented as any suitable RE. In some embodiments, the reference REs may include REs for transmitting a reference signal (RS). For example, the REs based on the predefined pattern may be arranged at a distance below a threshold distance from the REs for the transmission of the RS. In this way, a receiving side, the network device 220 may detect the first service from the terminal device 210 based on the RS and corresponding channel estimation. Accordingly, the transmission performance of the first service may be further improved. In some other embodiments, the predefined pattern of REs may be arranged to be frequency-hopping to further improve the reliability.

Figure 5:
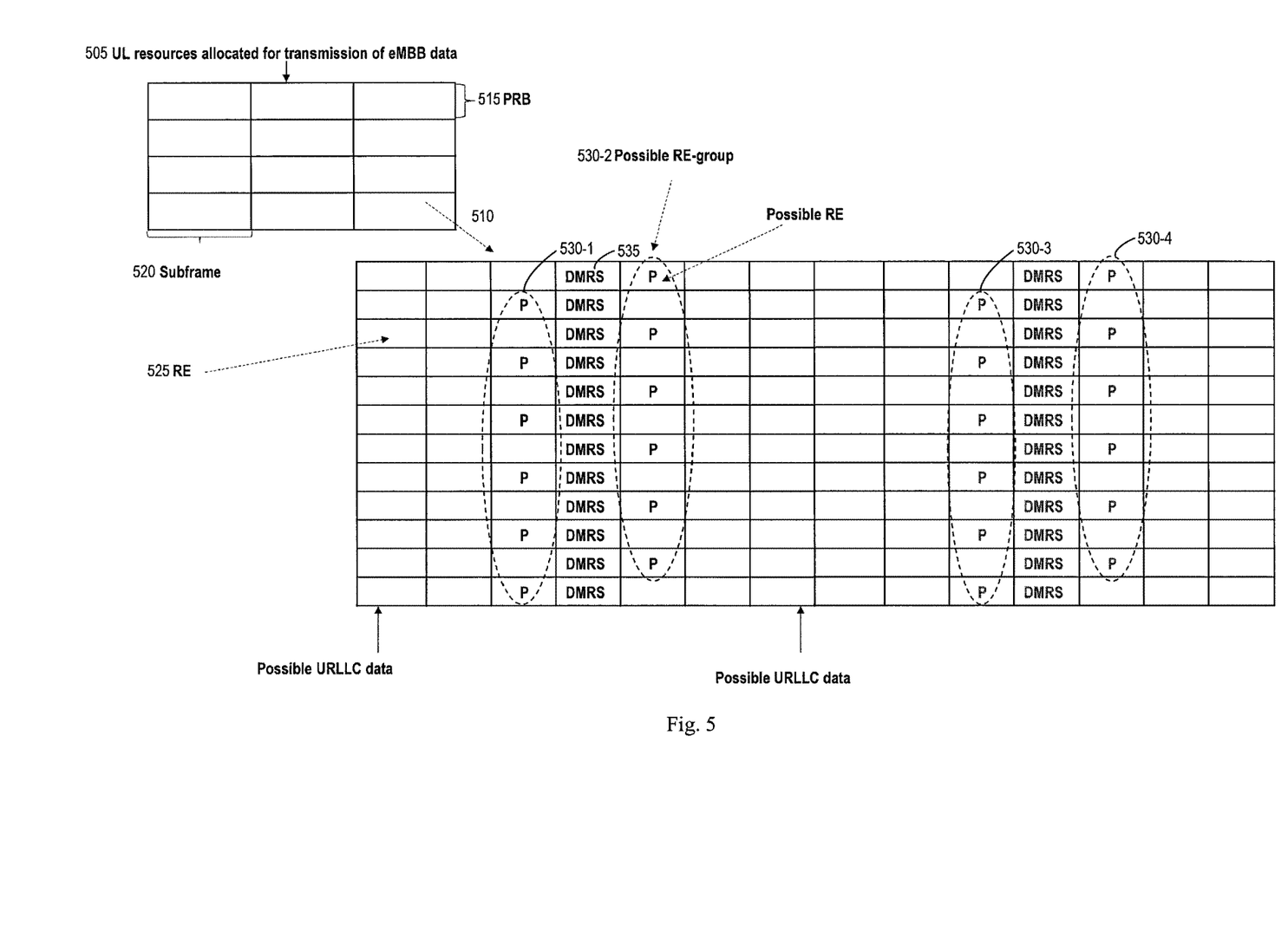
FIG. 5 shows an example predefined pattern of REs in accordance with some embodiments of the present disclosure.

An example pattern of REs in the vicinity of the RS is shown FIG. 5. In this example, the URLLC and eMBB services are also taken as examples of the first and second services, respectively. As shown, UL time and frequency resources 505 have been allocated for the transmission for the eMBB data. The UL time and frequency resources 505 include a plurality of resource blocks 510. One of the resource blocks 510 occupies one PRB 515 in the frequency domain and one subframe 520 in the time domain. A PRB 515 may include a plurality of subcarriers in the frequency domain and a slot in the time domain.

A resource block 510 includes a plurality of REs 525. One of the REs 525 occupies one OFDM symbol in the time domain and one subcarrier in the frequency domain. In the resource block 510, the predefined pattern of REs for the URLLC service is arranged to include four groups of REs (denoted by "P") 530-1, 530-2, 530-3, and 530-4 (collectively referred to as "REs 530") immediately prior and subsequent to the REs 535 for the transmission of the RSs in the time domain. As shown, an example of the RSs is a Demodulation Reference Signal (DMRS).

As shown, if the URLLC data arrives at the terminal device 210 prior to the REs 530-1, the REs 530-1 and 530-2 may be selected for the transmission of the URLLC data. If the URLLC data arrives between the REs 530-2 and 530-3, the REs 530-3 and 530-4 may be selected for the transmission.

It is to be understood that the pattern that the pattern of REs where involved REs are immediately adjacent to the REs for the RS as shown in FIG. 5 is only for the purpose of illustration, without suggesting any limitations. Other arrangements in associated with the RE of the RS are also possible. For example, the predefined pattern of REs may be arranged to be at a distance of one or more OFDM symbol from the RE of the RS in the time domain.

The predefined pattern of REs may be represented in any suitable form. For example, the predefined pattern may be directly represented in indexes of the related REs. As an alternative example, the predefined pattern may be represented as an offset between the REs involved in the pattern and reference REs. The reference REs may include any suitable RE that is associated with the predefined pattern of REs. In the embodiment where the predefined pattern of REs is arranged in associated with the REs for the RS, the REs for the RS may function as the reference REs. In this example, the pattern of REs may be represented by a position offset between involved REs and the RSs.

Next, still with reference to FIG. 4, after the first set of REs are selected, at block 420, the terminal device 210 transmits the first signal for the first service to the network device 220 at the first set of REs. The transmission of the first signal may be implemented in any suitable way.

In the embodiment where the first and second services are implemented as the URLLC and eMBB services, the URLLC data may form a MAC PDU or TB independent of the MAC PDU or TB of the eMBB data, for example. In this case, the terminal device 110 may have a new MAC PDU generated only for the URLLC data. A data packet for the URLLC service may have a small size of 50 or 200 bytes. Accordingly, the MAC PDU/TB of the URLLC data may be very short. After this new MAC PDU is generated, the MAC PDU may be directly passed from a MAC layer to a physical layer (L1) for transmission. At the same time, an indication may be sent from the MAC layer to the physical layer to indicate that the MAC PDU needs to be transmitted as soon as possible.

Then, the URLLC data may be transmitted at the physical layer. This transmission may be implemented by puncturing the MAC PDU/TB for the eMBB service at the first set of REs. The puncturing may be performed in any suitable approach. In some embodiments, the punctured REs may be used to transmit the first signal for the first service instead of the second service. Accordingly, at the receiving side, the network device 220 may detect the URLLC data at these REs. Embodiments in this regard will be described in the following paragraphs with reference to FIG. 7.

For example, if the URLLC data is modulated with an m-ary Quadrature Amplitude Modulation (QAM) scheme and the eMBB data is modulated with an n-ary Quadrature Amplitude Modulation (QAM) scheme, the m-ary QAM symbol of the URLLC data will replace the n-ary QAM symbol previously intended for the eMBB data. Other REs of the granted UL resources may be still used to transmit a signal (referred to as a "second signal") for the eMBB service, such as the eMBB data.

In some other embodiments, the punctured REs may be used for the transmission of both the first and second services. For example, the terminal device 210 may superimpose the first signal for the first service and a part (referred to as a "first part") of the second signal for the second service as a superimposed signal (referred to as a "third signal"). The terminal device 210 may then transmit the third signal to the network device 220 at the first set of resource elements. In this example, the terminal device 210 may transmit another part (referred to as a "second part") of the second signal to the network device at other REs in the allocated resource block.

The superimposing of the signals may be implemented in any suitable approach. In some embodiments, the superimposing may be implemented using a predetermined superposition modulation scheme. For example, the first signal and the first part of the second signal may be modulated to generate a superposition-modulated QAM symbol. Then, the superposition-modulated QAM symbol may be transmitted using the punctured REs. The superposition modulation is known in the art, and details thereof will be omitted here.

During the superposition modulation, the power ratio of the two signals may be specified according to their QoS requirements. For example, considering the high reliability requirements of the URLLC service, the first signal of the URLLC service may be prioritized over the second signal of the eMBB service in the terms of the transmission power.

It is to be understood that the superposition modulation as an example implementation of the superimposing are only for the purpose of illustration. Other implementations of the superimposing may also be possible. For example, the superimposing may be implemented by superposition-coding in a code domain. Accordingly, the network device 220 may demodulate or decode received signals based on the pre-configured superimposing approach.

In addition to the pattern of the REs for the second service, in some embodiments, some parameters related to the transmission of the first signal may be pre-configured. In some embodiments, the terminal device may receive the parameters from the network device 220.

The parameters include any suitable parameter for the transmission. For example, a Code Block (CB) size for the first service and its padding (non-padding) configuration may be specified or pre-configured. A candidate TB size list may also be preconfigured. The terminal device 210 may determine which TB size will be used for the transmission of the first signal.

Furthermore, a modulation and coding scheme (MCS) may be pre-configured for a specific service. For example, a Quadrature Phase Shift Keying (QPSK) modulation scheme may be configured to be used at the punctured RE for the URLLC service. A cyclic redundancy check (CRC) sequence may also be pre-configured. For example, considering the residual error requirements of the URLLC service, a longer CRC sequence may be assigned to achieve a lower residual error.

In addition, a transmission power of the first service may be pre-configured. In the embodiment where the first signal for the first service and the first part of the second signal for the second service are superimposed at the first set of REs, the transmission power of the first signal may be set in relation to the transmission power of the first part of the second signal. As an example, the transmission power of the first signal may be a function of the transmission power of the first part of the second signal, the MCSs of the two signals, and a preconfigured power offset between the two services. The configuration of the transmission power, such as an algorithm and related parameters, may be notified by the network device 220 to the terminal device 210 in any suitable timing. As an example, the notification may be performed at a session setup procedure of the first service.

Figure 6:
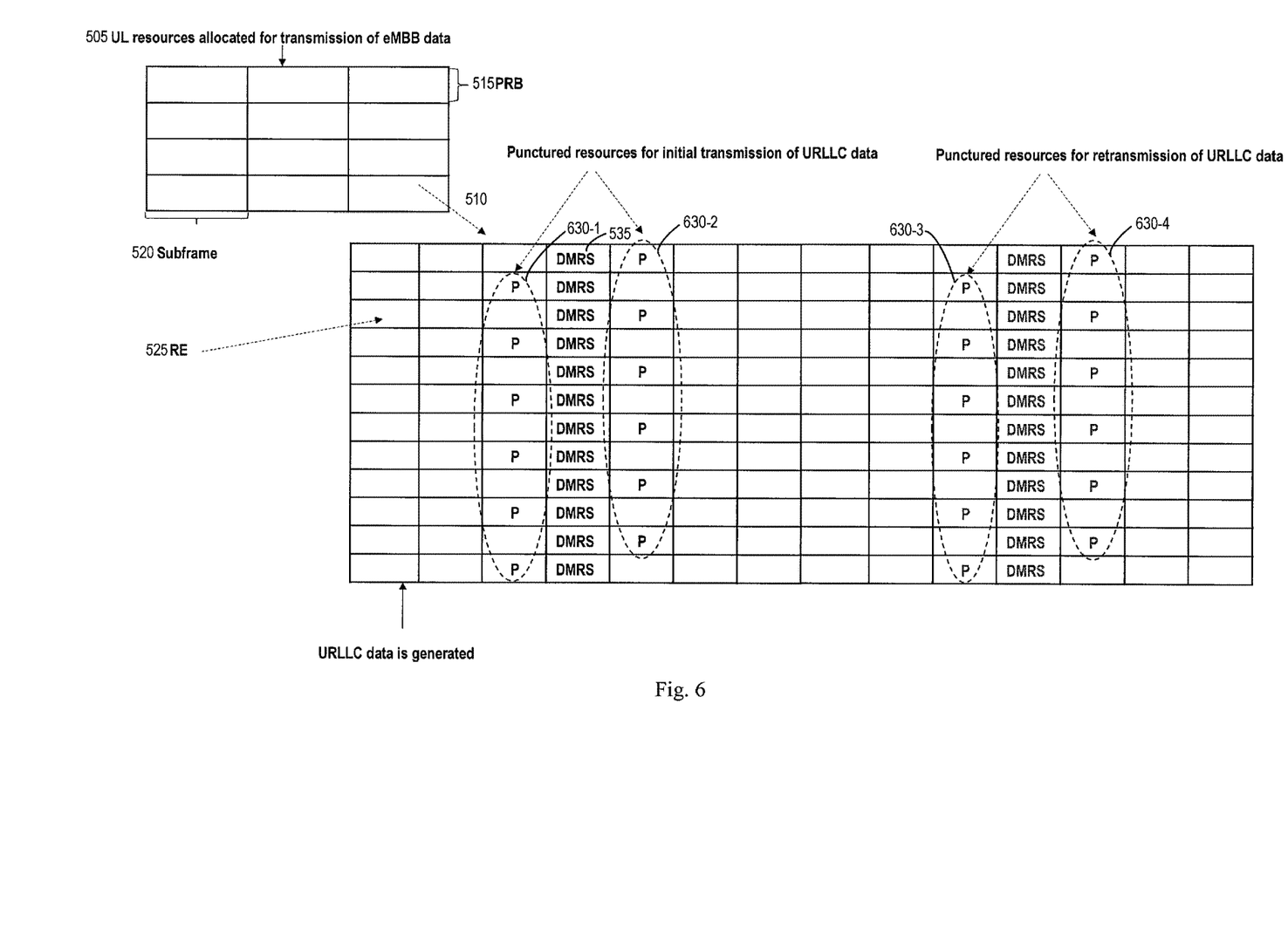
FIG. 6 shows an example of autonomous repetitions in accordance with some embodiments of the present disclosure.

In order to further enhance the transmission reliability, bundled transmission may be preconfigured. For example, the bundled repetitions of the first signal may be pre-configured. FIG. 6 shows an example of autonomous repetitions according to some embodiments of the present disclosure. In this example, during the transmission of the eMBB data, the URLLC data is generated at the terminal device 210 prior to the REs 630-1. The REs 630-1 and 630-2 are predefined to be used for initial transmission of the URLLC data, and the REs 630-3 and 630-4 are predefined to be used for retransmission of the URLLC data. In this way, the time interval between the two transmissions may be configured to be lower than one subframe (for example, 1 ms) to further reduce the latency of the URLLC service.

In some cases, a size of TB and/or a MCS for the second service may be dynamically changed. Furthermore, potential REs interfered by the first service may be semi-static. In these cases, some code blocks of the second service may have more bits punctured, but some other code blocks of the second service may have less bits punctured. Therefore, some code blocks may suffer a higher error rate, which may result in the retransmission of the whole TB of the second service.

In order to further enhance the transmission performance or efficiency of the second service, in some embodiments, after the terminal device 210 obtains a code block to be transmitted for the second service, the terminal device 210 may select a set of REs (referred to as "a second set of REs") in the allocated resource block. The number of REs in an intersection of the first and second sets of REs is below a threshold number (referred to as a "second threshold number"). Then, the terminal device 210 may map the code block to the second set of REs. In this way, the probabilities that the REs for the code blocks of the second service may be interfered by the first service may be equalized. Thereby, similar transmission performance may be achieved for individual code blocks, and the transmission performance of the second service may be improved.

As an example, the resources allocated for the second service may be divided into two parts. One part (referred to as a "first part") includes all REs not shared with the first service, and the other part (referred to as a "second part") includes all REs potentially shared with the first service. In some embodiments, the potentially shared REs may be arranged to equally fall into the resource for the individual code blocks.

An example of this arrangement will be discussed below. In this example, $G_{non-share}$ represents the total number of bits available to one TB carried at the first part of REs, and $G_{share}$ represents the total number of bits available to one TB carried at the second part of REs. The number of coded bits for the rth code block (represented by E') can be determined according to the following procedure:

```
{Set E' = 0, r=0, 1,...,C-1
LOOP: G' = {G_non-share/Q_m, G_share/Q_m }
Set γ = G' mod C
if r ≤ C - γ - 1
    set E = Q_m ·⌊G' / C⌋
else
    set E = Q_m ·⌈G' / C⌉
end if
E' = E' +E
End}
``` where $Q_m$ is equal to 2, 4, 6, or 8, which corresponds to QPSK, 16QAM, 64QAM, or 256QAM, respectively; and C represents the number of code blocks. It is noted that the number of mapped bits (REs) is a sum of the REs from the first and second parts for each code block.

In this example, one MIMO layer is considered. If more than one layer is used, the above procedure may be updated accordingly. In this way, the impacted REs are almost equally distributed in the individual code blocks, and therefore the transmission performance of the second service may be improved.

In some embodiments, the modulation orders for the REs of the two parts may be different. For example, the modulation order for the second part may be lower than that for the REs of the first part. As a specific example, a QPSK modulation scheme with a relatively low modulation order may used for the second part of REs, and a 16QAM modulation scheme with a relatively high modulation order may be used for the first part of REs. Accordingly, the first part of the second signal may be modulated with the QPSK modulation scheme, and the second part of the second signal may be modulated with the 16QAM modulation scheme.

In addition to modulation orders, in some embodiments, different code rates may be applied to the two parts of REs in order to further improve the transmission performance of the second service. Accordingly, the first and second parts of the second signal may be encoded with different code rates.

After the terminal device 210 transmits the first and second signals for the two services to the network device 220, the terminal device 210 may receive a positive acknowledgement (ACK) or negative acknowledgement (NACK) for both of the two signals from the network device 220. The acknowledgement may be implemented in any suitable way. In some embodiments, separate Hybrid Automatic Repeat Quest (HARQ) processes may be used respectively for the two services. Accordingly, the terminal device 210 may receive respective ACK/NACKs for the two services. In some embodiments, an integrated HARQ process may be used, and one ACK/NACK feedback may be received for the two services. In some other embodiments, the network 200 may enable the above two HARQ procedures. In this case, the terminal device 210 may receive ACK/NACKs from the network device 220 for both or single TBs multiplexed at the punctured REs.

Figure 7:
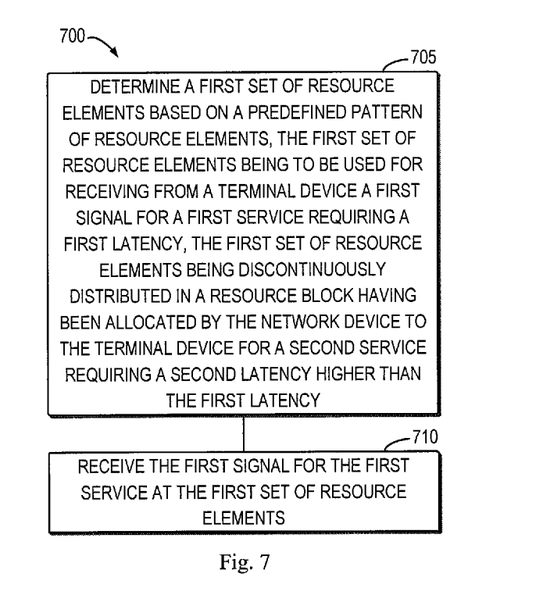
FIG. 7 shows a flowchart of an example method in accordance with some other embodiments of the present disclosure.

FIG. 7 shows a flowchart of an example method 500 in accordance with some embodiments of the present disclosure. The method 500 can be implemented at the network device 220 as shown in FIG. 2. For the purpose of discussion, the method 700 will be described with reference to FIG. 2.

At block 705, the network device 220 determines a first set of resource elements based on a predefined pattern of REs. The first set of REs are to be used for receiving from the terminal device 210 a first signal for a first service requiring a first latency, and the first set of REs are discontinuously distributed in a resource block having been allocated by the network device 220 to the terminal device 210 for a second service requiring a second latency higher than the first latency. Then, at block 710, the network device 220 receives the first signal for the first service at the first set of REs.

As described above, in some embodiments, the modulation schemes for the first set of REs and other REs of the resource block may be different. In this case, the network device may detect the first signal based on the corresponding modulation scheme. In the embodiment where the M-ary QAM modulation scheme is applied to the punctured REs and the N-ary QAM modulation scheme is applied to other REs, if the M-ary QAM symbols are found at the punctured REs instead of N-ary QAM symbols, the network device 220 may determine that the puncturing happened.

Demodulation and decoding units in the network device 220 may process the data separately at different REs. Then, the two sets of QAM symbols may be decoded to form two MAC PDUs. If the corresponding CRC passes, the MAC PDUs may be passed to the MAC layer.

If it is determined puncturing happened, and the puncturing is done by a replacement of the QAM symbols, the decoding unit of the network device 220 may set the data at the punctured REs to be zero or other values depending on different decoding algorithms. If the puncturing is implemented by the superposition modulation, at the punctured REs, the demodulation unit (or a demodulator) of the network device 220 needs to demodulate a superimposed QAM symbol to obtain two QAM symbols out of one superimposed QAM symbol.

If the modulation schemes are same for all REs, or it is difficult to determine the modulation and/or coding scheme, the network device 220 may consider possible puncturing schemes at the predefined REs or no-puncturing. For example, the network device 220 may try all of the possible puncturing schemes to determine whether the puncturing has been performed.

It is to be understood that all operations and features related to the network device 220 described above with reference to FIGS. 4-6 are likewise applicable to the method 700 and have similar effects. For the purpose of simplification, the details will be omitted.

Figure 8:
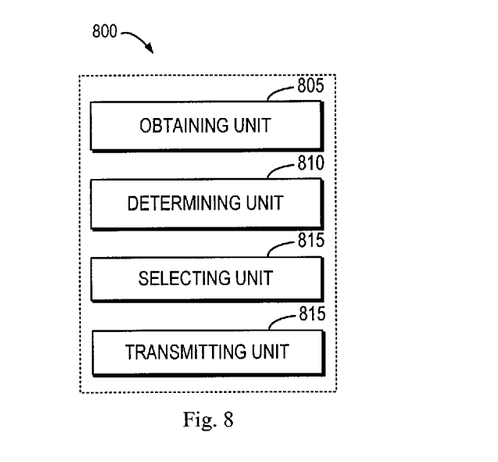
FIG. 8 shows a block diagram of an apparatus in accordance with some embodiments of the present disclosure.

FIG. 8 shows a block diagram of an apparatus 800 in accordance with some embodiments of the present disclosure. The apparatus 800 can be considered as an example implementation of the terminal device 210 as shown in FIG. 2.

As shown, the apparatus 800 comprises: an obtaining unit 805 configured to obtain a first signal to be transmitted for a first service requiring a first latency; a determining unit 810 configured to determine whether a resource block has been allocated by a network device for a second service requiring a second latency higher than the first latency; a selecting unit 815 configured to in response to determining that the resource block has been allocated for the second service, select a first set of resource elements based on a predefined pattern of resource elements, the first set of resource elements being discontinuously distributed in the allocated resource block; and a transmitting unit 820 configured to transmit the first signal for the first service to the network device at the first set of resource elements.

Figure 9:
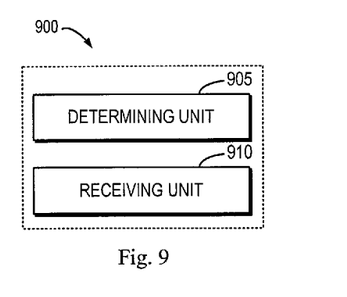
FIG. 9 shows a block diagram of an apparatus in accordance with some other embodiments of the present disclosure.

FIG. 9 shows a block diagram of an apparatus 900 in accordance with some other embodiments of the present disclosure. The apparatus 900 can be considered as an example implementation of the network device 220 as shown in FIG. 2.

As shown, the apparatus 900 comprises: a determining unit 905 configured to determine a first set of resource elements based on a predefined pattern of resource elements, the first set of resource elements being to be used for receiving from a terminal device a first signal for a first service requiring a first latency, the first set of resource elements being discontinuously distributed in a resource block having been allocated by the network device to the terminal device for a second service requiring a second latency higher than the first latency; and a receiving unit 910 configured to receive the first signal for the first service at the first set of resource elements.

It should be appreciated that units included in the apparatuses 800 and 900 correspond to the blocks of the methods 400 and 700, respectively. Therefore, all operations and features described above with reference to FIGS. 4 to 7 are likewise applicable to the units included in the apparatuses 800 and 900 and have similar effects. For the purpose of simplification, the details will be omitted.

The units included in the apparatuses 800 and 900 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the terminal device 500 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Figure 10:
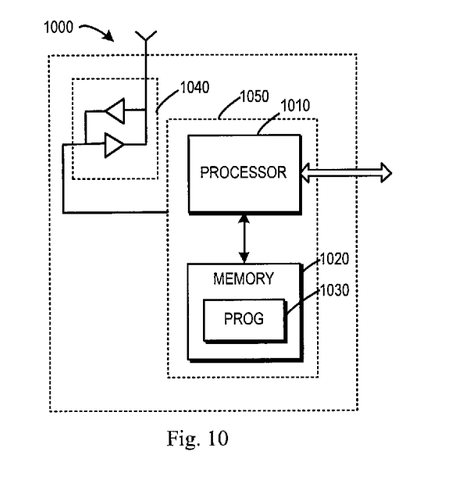
FIG. 10 shows a simplified block diagram of a device that is suitable for implementing embodiments of the present disclosure.

FIG. 10 is a simplified block diagram of a device 1000 that is suitable for implementing embodiments of the present disclosure. The device 1000 can be considered as a further example implementation of the terminal device 210 or the network device 220 as shown in FIG. 2. Accordingly, the device 1000 can be implemented at or as at least a part of the terminal device 210 or the network device 220.

As shown, the device 1000 includes a processor 1010, a memory 1020 coupled to the processor 1010, a suitable transmitter (TX) and receiver (RX) 1040 coupled to the processor 1010, and a communication interface coupled to the TX/RX 1040. The memory 1010 stores at least a part of a program 1030. The TX/RX 1040 is for bidirectional communications. The TX/RX 1040 has multiple antennas to facilitate communications. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a UE.

The program 1030 is assumed to include program instructions that, when executed by the associated processor 1010, enable the device 1000 to operate in accordance with the embodiments of the present disclosure, as discussed herein with reference to FIGS. 3 to 7. The embodiments herein may be implemented by computer software executable by the processor 1010 of the device 1000, or by hardware, or by a combination of software and hardware. The processor 1010 may be configured to implement various embodiments of the present disclosure. Furthermore, a combination of the processor 1010 and memory 1010 may form processing means 1050 adapted to implement various embodiments of the present disclosure.

The memory 1010 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1010 is shown in the device 1000, there may be several physically distinct memory modules in the device 1000. The processor 1010 may be of any type suitable to the local technical network, and may include one or more of general purpose computers, special purpose computers, microprocessors, digital signal processors (DSPs) and processors based on multicore processor architecture, as non-limiting examples. The device 1000 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 400 and 700 as described above with reference to FIGS. 4-7. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method implemented at a terminal device, comprising:
    obtaining a first signal to be transmitted for a first service requiring a first latency;
    determining whether a resource block has been allocated by a network device for a second service requiring a second latency higher than the first latency, wherein the resource block refers to a plurality of resource elements that are continuous in time and frequency;
    in response to determining that the resource block has been allocated for the second service, selecting a first set of resource elements based on a predefined pattern of resource elements, the first set of resource elements being discontinuously distributed in time and frequency domains within the allocated resource block; and
    transmitting the first signal for the first service to the network device at the first set of resource elements.

2. The method of claim 1, further comprising:
receiving an indication of the predefined pattern of resource elements from the network device; or
obtaining a code block to be transmitted for the second service;
selecting a second set of resource elements in the allocated resource block, the number of resource elements in an intersection of the first and second sets of resource elements being below a second threshold number; and
mapping the code block to the second set of resource elements.

3. The method of claim 1, wherein selecting the first set of resource elements comprises:
determining, based on the predefined pattern of resource elements, resource element candidates of the allocated resource block to be potentially used by the first service, the resource element candidates being discontinuously distributed in the allocated resource block; and
selecting the first set of resource elements from the resource element candidates; or
selecting the first set of resource elements within a predetermined number of slots in the allocated resource block, the predetermined number being below a first threshold number; or
selecting, in the allocated resource block, the first set of resource elements positioned at a distance below a threshold distance from reference resource elements.

4. The method of claim 1, further comprising:
determining at least one parameter for the transmission of the first signal, the at least one parameter being selected from at least one of: a transmission power, bundled repetition numbers, a size of a code block, padding configuration of the code block, a size of a transmission block, a modulation and coding scheme, and a Cyclic Redundancy Check, CRC, sequence.

5. The method of claim 4, further comprising:
receiving the at least one parameter from the network device.

6. The method of claim 1, further comprising:
transmitting a second signal for the second service to the network device at other resource elements than the first set of resource elements in the allocated resource block.

7. The method of claim 6, further comprising:
receiving an acknowledgement for at least one of the first and second signals from the network device.

8. The method of claim 1, wherein transmitting the first signal for the first service comprises:
superimposing the first signal for the first service and a first part of a second signal for the second service as a third signal; and
transmitting the third signal to the network device at the first set of resource elements.

9. The method of claim 8, wherein superimposing the first signal and the first part of the second signal comprises:
superimposing the first signal and the first part of the second signal as the third signal by modulating the first signal and the first part of the second signal using a predetermined superposition modulation scheme.

10. The method of claim 8, further comprising:
transmitting a second part of the second signal to the network device at other resource elements than the first set of resource elements in the allocated resource block.

11. The method of claim 10, wherein the first part of the second signal is modulated with a first modulation order, and the second part of the second signal is modulated with a second modulation order higher than the first modulation order; or
wherein the first part of the second signal is encoded with a first code rate, and the second part of the second signal is encoded with a second code rate different from the first code rate.

12. A method implemented at a network device, comprising:
determining a first set of resource elements based on a predefined pattern of resource elements, the first set of resource elements being to be used for receiving from a terminal device a first signal for a first service requiring a first latency, the first set of resource elements being discontinuously distributed in time and frequency domains within a resource block having been allocated by the network device to the terminal device for a second service requiring a second latency higher than the first latency, wherein the resource block refers to a plurality of resource elements that are continuous in time and frequency; and
receiving the first signal for the first service at the first set of resource elements.

13. The method of claim 12, further comprising:
sending an indication of the predefined pattern of resource elements to the terminal device; or
receiving a second signal for the second service from the terminal device at other resource elements than the first set of resource elements in the resource block.

14. The method of claim 12, wherein determining the first set of resource elements comprises:
determining, based on the predefined pattern of resource elements, resource element candidates of the resource block to be potentially used by the first service, the resource element candidates being discontinuously distributed in the allocated resource block; and
determining the first set of resource elements from the resource element candidates; or
determining the first set of resource elements within a predetermined number of slots in the resource block, the predetermined number being below a first threshold number; or
determining, in the resource block, the first set of resource elements positioned at a distance below a threshold distance from reference resource elements.

15. The method of claim 12, further comprising:
determining at least one parameter for the reception of the first signal, the at least one parameter being selected from at least one of: a transmission power, bundled repetition numbers, a size of a code block, padding configuration of the code block, a size of a transmission block, a modulation and coding scheme, and a Cyclic Redundancy Check, CRC, sequence.

16. The method of claim 15, further comprising:
sending the at least one parameter to the terminal device.

17. The method of claim 12, wherein receiving the first signal for the first service comprises:
detecting a signal candidate at the first set of resource elements.

18. The method of claim 17, wherein receiving the first signal for the first service further comprises:
demodulating the detected signal candidate using a first demodulation scheme associated with a first modulation order; or
decoding the detected signal candidate using a first decoding scheme associated with a first code rate.

19. The method of claim 17, wherein receiving the first signal for the first service further comprises:
- demodulating, using a third demodulation scheme associated with a predetermined superposition modulation, the detected signal candidate to obtain the first signal and a first part of a second signal for the second service.

20. The method of claim 19, further comprising:
- receiving a second part of the second signal from the terminal device at other resource elements than the first set of resource elements in the resource block; or
- transmitting an acknowledgement for at least one of the first and second signals to the terminal device.

\* \* \* \* \*